R. P. ESTRADA.
ANIMAL TRAP.
APPLICATION FILED APR. 1, 1914.
1,118,752.
Patented Nov. 24, 1914.
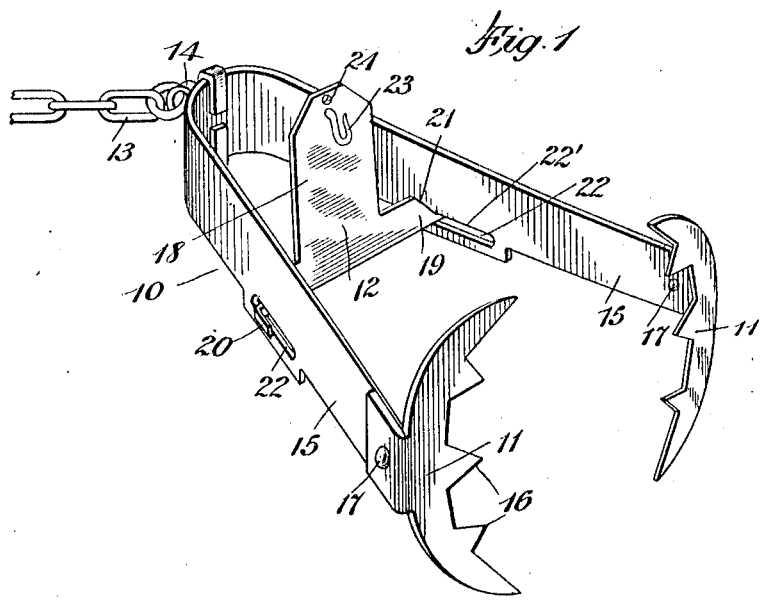
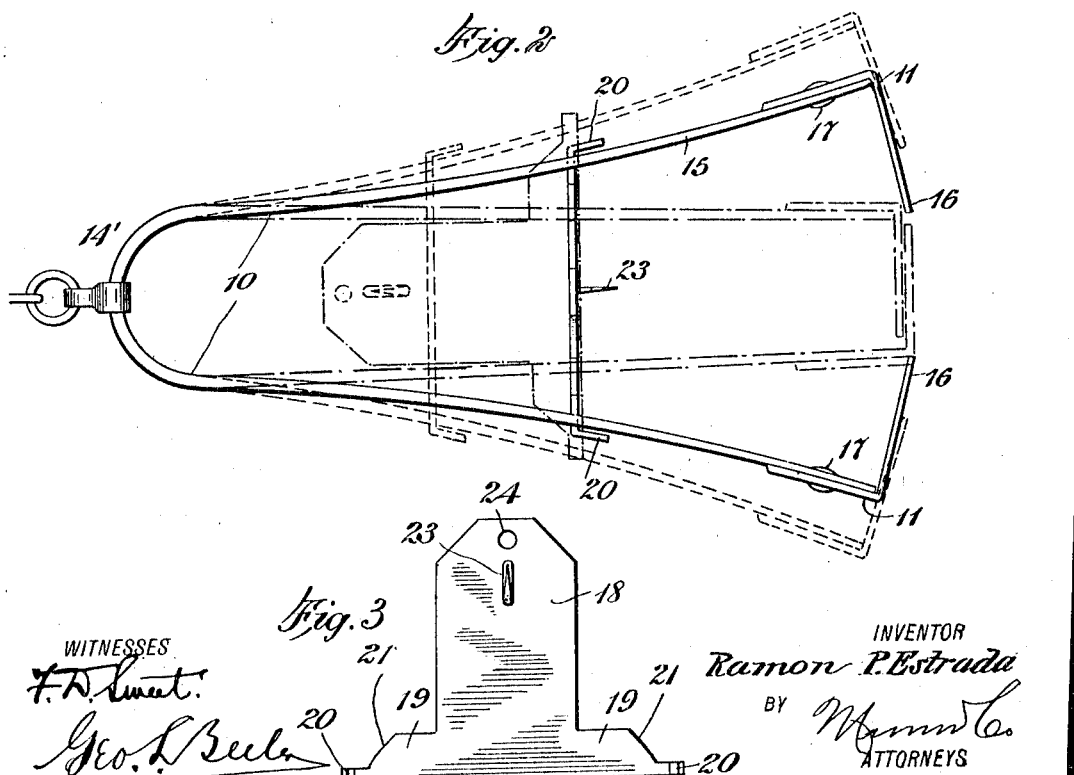
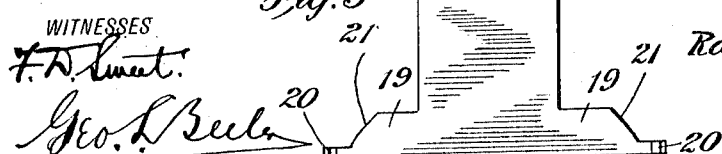
INVENTOR
Ramon P. Estrada

UNITED STATES PATENT OFFICE.

RAMON PESQUEIRA ESTRADA, OF MAGDALENA, MEXICO.

ANIMAL-TRAP.

1,118,752.  Specification of Letters Patent.  Patented Nov. 24, 1914.

Application filed April 1, 1914. Serial No. 828,689.

*To all whom it may concern:*

Be it known that I, RAMON P. ESTRADA, a citizen of Mexico, and a resident of Magdalena, Sonora, Mexico, have invented a new and Improved Animal-Trap, of which the following is a full, clear, and exact description.

This invention relates to fishing and trapping, and has particular reference to traps for animals.

Among the objects of the invention is to provide a device of the character indicated which is of an exceedingly simple construction, being made principally of sheet metal of uniform thickness stamped and bent into the form desired.

Another object of the invention is to provide a trap including a trigger which may be set at different distances from the jaws and is adapted to be sprung either by pushing or pulling it, according to the nature of the animals to be caught.

A further object of the invention is to improve the trigger construction of a trap of this nature which, in addition to being operated either by pushing or pulling, may readily be set delicately for the purposes of the device.

The foregoing and other objects of the invention will hereinafter be more fully described and claimed and illustrated in the drawings forming a part of this specification in which like characters of reference indicate corresponding parts in all the views, and in which—

Figure 1 is a perspective view showing the trap in one set position; Fig. 2 is a plan view of the same, but indicating a different adjustment of the trigger mechanism; and Fig. 3 is a vertical face view of the trigger.

The several parts of the device may be made of any suitable materials, and the relative sizes and proportions, as well as the general design of the mechanism, may be varied to a considerable extent without departing from the spirit of the invention hereinafter more fully set forth and specifically claimed.

As shown in the drawings, the trap comprises but two principal parts, namely, a yoke 10 including jaws 11, and a trigger member 12. The trap thus constituted may obviously be secured in definite position by means of a chain 13 secured to the yoke by means of a clip or the like 14 to prevent loss of the trap.

The yoke member 10 is made up preferably of spring plate material bent so that the two shank portions 15 thereof tend to lie substantially parallel to each other and close together, but they are adapted to be spread apart under force, as shown in Figs. 1 and 2. To the outer or free end of each of the shanks 15 is rigidly secured a jaw 11. Each jaw preferably includes a series of teeth 16, the teeth of one jaw extending toward those of the other, but the jaws are so related that one is adapted to overlap the other, as shown in dot and dash lines in Fig. 2. It is obvious that the jaw members 11 with their teeth 16 may be made integral with the yoke member of the same sheet metal by a simple operation, but in some cases it may be preferable to form them of separable pieces and secure them to the free ends of the shanks 15 by rivets 17 or the like. The other main part 12 of the trap constitutes a trigger device and comprises a substantially flat plate portion 18 and a pair of wing portions 19, all formed preferably of one piece of sheet metal of uniform thickness. The outer ends of the wings terminate in hooks 20 which extend beyond beveled shoulders 21 and the extreme ends are adapted to be turned at an angle to the main plane of the trigger member. The wings 19 at the shoulders 21 are preferably beveled as shown so as to facilitate the rotation of the trigger member either in springing or setting the trap and also to provide a more delicate locking effect between the shoulders 21 and the edges of the slots 22.

The hooks 20 project freely outwardly through slots 22 formed longitudinally along the lower edges of the shank members 15 and of such length as to allow considerable latitude of adjustment of the trigger member longitudinally of said shank members so as to adapt the trap to animals of different sizes or natures. The shoulders 21 of the wing portions 19 are adapted to bear directly against the edges 22' of the slots 22, and when the shank members 15 are forced away from each other against the tension of the spring, said shank members and the loop portion of the yoke, and with the trigger member extending substantially at a right angle to the longitudinal axis of the trap, the trigger member will constitute a strut holding the jaws apart, as shown in Fig. 1. Practically, in order to set the trap, it is turned upside down or into that position in which the plate portion 18 of the trigger will tend to gravitate downwardly, making the setting of the trap substantially automatic when the jaws are forced apart by the operator's hands or otherwise.

When the trap is sprung, the flat portions or the wings 19 of the trigger member lie within the slots 22 and prevent rotation of the trigger member in such slots, and since the main plate 18 is longer than the length of the slots there is no danger of accidental loss of the trigger from the yoke. The hooks 20 also prevent accidental separation of these two main parts.

As above premised, the trap may be sprung by movement of the trigger toward or away from the jaws causing the same to rotate toward the horizontal position around the transverse line connecting the hooks through the lower edge of the trigger member. The trigger plate member 18 may be set squarely at a right angle to the general plane of the yoke and in this position the trap is the hardest to spring; that is to say, it will require more force to push or pull the trigger around its axis of rotation due to the frictional engagement between the shoulders 21 and the edges 22' of the shanks. When, however, it is desired to set the trigger lightly or delicately, it will be inclined as much as desired in the direction in which it will be moved to spring the trap by the particular species of animals to be trapped and whereby less force will be required to overcome the friction between the engaging parts. When the trap is set for burrowing animals, the trigger plate 18 will preferably be inclined away from the jaws whereby it will be in position to be pushed by the animal passing along its path between the jaws. For this purpose the trigger member may be set at or adjacent the ends of the slots 22 nearest to the jaws, as shown in full lines in Fig. 2. If, however, the trap is to be set for animals which, according to their nature, are inclined to pull the bait, any suitable bait may be attached to the upper portion of the plate 18 either by a hook 23 or by tying it in a hole 24 formed through such plate. In this event it is usually advisable to set the trigger member more remote from the jaws so that in either event the animal is caught by the jaws substantially around its neck and immediately suffocated by such jaws. For certain species of animals it will be necessary for the trap to be housed by some sort of cage structure so as to insure that the animal to be caught will enter the trap between the jaws rather than to permit him to try to get the bait by passing over the shanks or otherwise. Such housing is not illustrated, since it constitutes no part of the invention *per se*.

The ends of the slots 22 are preferably rounded or semi-circular, and hence when the trigger is set adjacent such ends there is no frictional resistance to the desired rotation of the trigger. If the slots were otherwise formed there might result more or less locking of the trigger when set against the ends of the slots.

Having thus described my invention, I claim as new and desire to secure by Letters Patent:—

1. In an animal trap, the combination of a yoke member including a pair of shanks and jaws at the ends of the shanks, each of the shank members being formed with a longitudinal slot parallel to the general axis of such shank, and a trigger member, said trigger member comprising a plate, a pair of wings extending laterally from the plate and through said slots, said wings being formed with shoulders coacting with the edges of the slots to hold the trap in set position, substantially as set forth.

2. In an animal trap, the combination of a pair of jaws, means to cause the jaws to approach each other to seize the animal, and a trigger member adapted to hold the jaws forced apart when the trap is set, said trigger member comprising a piece of metal having outwardly extending wings coöperating with the jaw members, said wings being provided with beveled shoulders forming interlocking means for the jaws, substantially as set forth.

3. In a trap of the kind set forth, the combination of a yoke having two side shanks each having a slot extending parallel to the axis of the shank, the ends of the slots being rounded, and a trigger member carried by the yoke and extending from one shank to the other through said slots, said trigger having beveled shoulders coöperating with the shanks to hold the yoke spread in set position, said trigger being adapted to be adjusted at any points along said slots and being rotatable in either direction from set position to allow the trap to spring.

In testimony whereof I have signed my name to this specification in the presence of two subscribing witnesses.

RAMON PESQUEIRA ESTRADA.

Witnesses:
 JUAN H. AÚZMENDEZ,
 P. B. TORRES.